US011643122B2

(12) United States Patent
Salinas et al.

(10) Patent No.: US 11,643,122 B2
(45) Date of Patent: May 9, 2023

(54) WAYSIDE TO RAILWAY VEHICLE COMMUNICATION METHOD AND DEVICE

(71) Applicant: ALSTOM Transport Technologies, Saint-Ouen-sur-Seine (FR)

(72) Inventors: Maximo Salinas, Melbourne, FL (US); Jeffrey Fries, Grain Valley, MO (US); John Ross, Melbourne, FL (US); Shawn Clark, Melbourne, FL (US); Phillip Martin, Melbourne, FL (US)

(73) Assignee: ALSTOM TRANSPORT TECHNOLOGIES, Saint-Ouen-sur-Seine (FR)

( * ) Notice: Subject to any disclaimer, the term of this patent is extended or adjusted under 35 U.S.C. 154(b) by 568 days.

(21) Appl. No.: 16/719,482

(22) Filed: Dec. 18, 2019

(65) Prior Publication Data

US 2021/0188335 A1 Jun. 24, 2021

(51) Int. Cl.

*B61L 27/70* (2022.01)
*H04B 1/02* (2006.01)
*H04L 67/12* (2022.01)

(52) U.S. Cl.

CPC ................ *B61L 27/70* (2022.01); *H04B 1/02* (2013.01); *H04L 67/12* (2013.01)

(58) Field of Classification Search

CPC .......... B61L 27/70; B61L 3/221; B61L 3/246; B61L 15/0036; H04B 1/02; H04L 67/12
See application file for complete search history.

(56) References Cited

U.S. PATENT DOCUMENTS

| | | | | |
|---|---|---|---|---|
| 3,946,972 | A | 3/1976 | Grundy | |
| 2014/0119414 | A1* | 5/2014 | Kiss | H04L 25/4908 375/259 |

FOREIGN PATENT DOCUMENTS

| | | | | | |
|---|---|---|---|---|---|
| DE | 102009000876 | A1 * | 8/2010 | | G08C 19/02 |
| GB | 2186725 | A * | 8/1987 | | B61L 3/008 |
| JP | 3742073 | B2 * | 2/2006 | | |
| JP | 2011146965 | A * | 7/2011 | | |
| JP | 2018125700 | A * | 8/2018 | | |
| JP | 2020068638 | A * | 4/2020 | | |
| WO | WO-2005104550 | A2 * | 11/2005 | | H04N 7/08 |

* cited by examiner

*Primary Examiner* — Jean B Corrielus
(74) *Attorney, Agent, or Firm* — Soquel Group LLC

(57) ABSTRACT

A wayside to railway vehicle communication method including providing a first wayside device with a transmitter device capable of transmitting a data packet message to a railway vehicle travelling along a section of a railway track, through an electric waveform put into a rail of the section, and sending at least one message from the transmitter device to the railway vehicle, wherein the at least one message corresponds to the conversion of the data packet into a modulated electric waveform, the data packet including several data bits providing information relative to a plurality of speed limits the railway vehicle has to respect while travelling along respective portions of the section.

12 Claims, 5 Drawing Sheets

PROVIDING TRANSMITTER FOR MODULATED MESSAGES

100

SENDING MESSAGE

102

WAYSIDE TO RAILWAY VEHICLE COMMUNICATION METHOD AND DEVICE

FIELD OF THE INVENTION

The present invention concerns a wayside to railway vehicle communication method; and related device.

BACKGROUND OF THE INVENTION

U.S. Pat. No. 3,946,972 describes a cab speed signaling system for a railway vehicle traveling along a section of track rails, via which speed code signals are transmitted according to a desired train speed on said track section.

Other current wayside to railway vehicle communication methods are based on the use of a very low bandwidth signal, transmitted by a wayside device towards a railway vehicle through a rail of a railway track on which the railway vehicle is placed. This signal provides only a single code selected from up to 32 possible codes (i.e., equivalent to 5 bits of information). The code is repeated for the duration of time the railway vehicle is on a section of the rail between the wayside device transmitting the code and a next wayside device.

The prior art method here above summarized places therefore a single code on the track and the current technology limits it to approximately 32 variants, i.e., one out of 32 possible codes, leading to the equivalent of 5 bits of information. These codes are sinusoid at defined frequencies superimposed onto square waves of specified duty cycle. Due to electrical noise introduced by the environment, the combination of parameters using current transmitters is limited to 32 combinations.

Since there is no information regarding the location of the railway vehicle along the rail, the code is repeated for the entire time the railway vehicle is on a same section of the railway track, as above indicated.

The main disadvantage of such method is that, through the single code, it is possible to communicate only one speed limit, and related instructions, to the railway vehicle.

This means that this speed limit must be equal to the slowest speed limit the railway vehicle has to respect along the entire section of the railway track on which it is travelling. If, for example, the railway track section contains rectilinear portions and bended portions, the railway vehicle must travel at the speed limit valid for the bended portions also along the rectilinear ones, this causing an unnecessary overall delay.

There is therefore the need to develop an innovative wayside to railway vehicle communication method, which allows communicating multiple speed limits to be applied by a railway vehicle while travelling along a same section of railway track between two consecutive wayside devices, thus overcoming the problems of the prior art.

SUMMARY OF THE DESCRIPTION

These and other objects are fully achieved by virtue of a wayside to railway vehicle communication method having the characteristics defined in independent claim 1.

Embodiments of the invention are specified in the dependent claims, whose subject-matter is to be understood as forming an integral part of the present description.

BRIEF DESCRIPTION OF THE DRAWINGS

Further characteristics and advantages of the present invention will become apparent from the following description, provided merely by way of a non-limiting example, with reference to the enclosed drawings, in which.

DETAILED DESCRIPTION

Currently, in cab signaled territory, a wayside device puts an analog signal representing one of a small number of possible codes into a rail, and the railway vehicle receives this code via coils in the undercarriage. In particular, the code is transformed in an electric signal, which is transmitted through the rail, and at the railway vehicle, the electric signal is inductively picked up by coils, placed for example in front of the most forward wheel of the railway vehicle. Then, the electric signal is turned back to a code, which is in turn elaborated in a manner per se known by an onboard railway vehicle elaboration unit.

Each of these codes provides the railway vehicle information relative to a speed limit and/or operating mode restriction the railway vehicle must respect, until a new code is received. Since there is no communication from the railway vehicle to the wayside device regarding the position of the railway vehicle along the railway track, the code is maintained for all the time the railway vehicle is occupying a section of a railway track placed between this wayside device and a next one.

Figure 1:
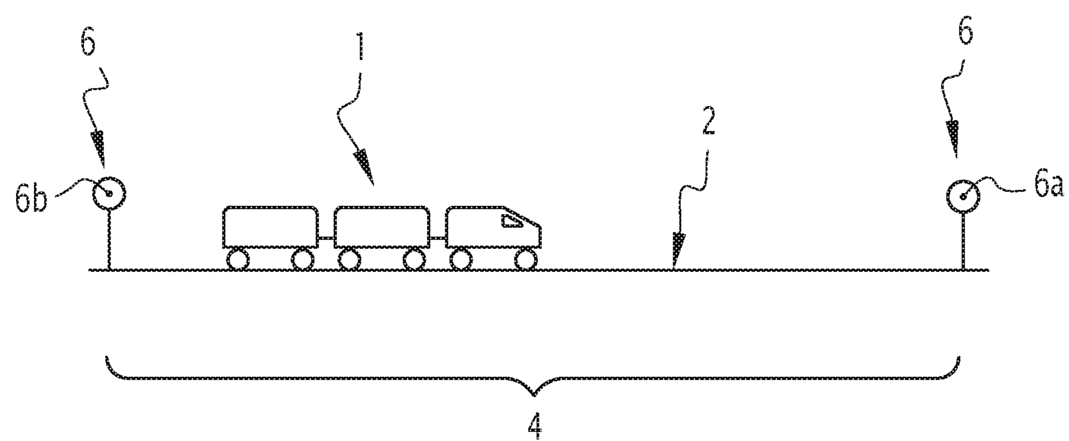
FIG. 1 is a prior art arrangement in which a railway vehicle is moving along a rail and is placed on a section of the rail between two wayside devices.

FIG. 1 shows a prior art arrangement in which a railway vehicle 1 is moving along a rail 2 and is placed on a section 4 of the rail 2 between two wayside devices 6.

A first wayside device 6*a* is arranged to put an electrical signal into the rail 2, this electric signal being further received by coils placed under the railway vehicle 1 and sent to an onboard elaboration unit of the railway vehicle 1. This electric signal contains information representative of a speed limit that the railway vehicle 1 must respect while travelling along the section 4.

A second wayside device 6*b* is not able to communicate with the railway vehicle 1 because the rear wheels of the railway vehicle 1 shunt down any signal that it may put in the rail 2.

Only the first wayside device 6*a* can communicate with the railway vehicle 1.

When the railway vehicle 1 has passed the first wayside device 6*a*, a further third wayside device not shown in the figure sends a new signal to the railway vehicle 1.

The prior art technology of FIG. 1 only allows one speed limit to be communicated to the railway vehicle 1, which is applicable throughout the entire section 4.

Figure 2:
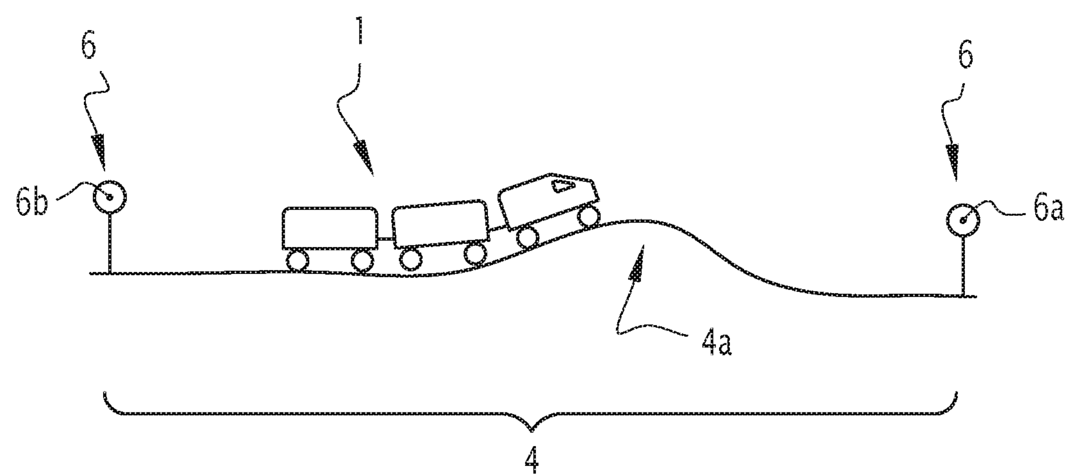
FIG. 2 shows the same elements of FIG. 1, wherein the section is not linear but includes a bend.

FIG. 2 shows the same elements of FIG. 1, wherein the section 4 is not linear but includes a bend 4*a*. In such a case, a single speed limit valid for all the section 4 would not be appropriate because it should be equal to the slowest speed limit the railway vehicle must respect along the bend 4*a*. According to the method of the prior art, the railway vehicle 1 should also travel along the rectilinear part of the section 4 at a speed lower than the one actually permitted in such rectilinear part, i.e., at the speed limit of the bended part. In another embodiment, the bend 4*a* may also represent a location on the rail where a speed restriction is required (such as a malfunctioning level crossing). In this case, the slowest speed limit represented by the speed restriction is required to be respected for the entire length between wayside devices 6.

The wayside to railway vehicle communication method of the present invention allows more complex messages to be sent from the first wayside device 6*a* to the railway vehicle 1. In particular, the messages can contain several data bits, advantageously up to 44 bits, as here below detailed. This allows more information to be sent to the railway vehicle 1.

In particular, the method of the present invention allows transmitting a more complex speed profile to be respected by the railway vehicle 1 throughout the entire section 4, with different multiple speed limits valid for different portions of the section 4. The speed profile is determined in a manner per se known by an onboard railway vehicle elaboration unit, by using onboard databases and/or specific data contained in the messages.

In addition, working zones or other temporary restrictions along the section 4 may similarly be communicated to the railway vehicle 1.

Figure 3:
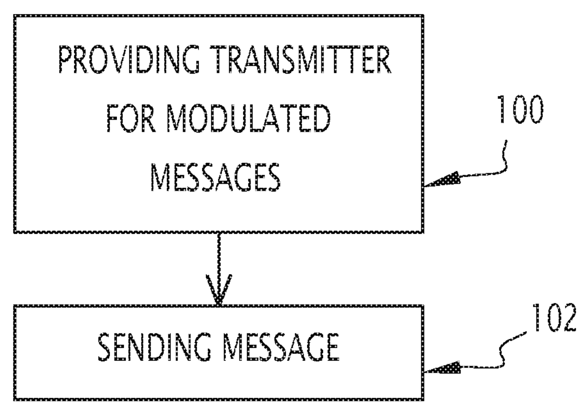
FIG. 3 is a block diagram of the steps performed by a method according to the present invention.

FIG. 3 is a block diagram of operations performed by a method according to the present invention.

The wayside to railway vehicle communication method of the present invention includes a first operation 100 of providing the first wayside device 6*a* with a transmitter device capable of transmitting modulated messages, as here below disclosed.

The modulated messages sent according to the method of the present invention each comprise information including, but not limited to, the followings: Block ID, Block Length, Block Speed, End Speed, Work Zone Present, Work Zone Location, Work Zone Speed. Block ID represents a unique identifier for a section of track on the railway. This may be used by an onboard evaluator to look up information relative to that track section in a database. Block Speed and End Speed represent the allowable speed at the entry and end points of the track section, respectively. The onboard evaluator may keep track of its distance traveled within the track section to enforce these speeds. Work Zone Present, Work Zone Location and Work Zone Speed identify if there is a speed restriction related to railway workers, the relative location of the work zone (starting/ending points within the track section) and speed limit within that area respectively. All of this data may be communicated with the 44 bits of information to be transmitted, using a predefined organization of these bits, mutually agreed to by the wayside and onboard systems.

The above description is intended to be illustrative of the type of information that can be sent. The present invention describes the ability to send a message with arbitrary (e.g., ASCII text) information. A Block ID, for example, may be sent to provide the railway vehicle the ability to extract characterization information about the block it is occupying, such as civil speeds, length, grades, etc. Similarly, if a work zone is present in the block, information about it may be sent as well. Because the data is serial, a long message can be sent, by breaking it up into multiple 44-bit packets, with the railway vehicle reconstructing the message per an agreed upon protocol previously predefined.

In a second operation 102, at least one modulated message having the structure above defined is sent by the transmitter to the railway vehicle 1, this message including a plurality of speed limits. This message is sent through an electric modulated waveform as here below detailed. The multiple speed limits are to be respected by the railway vehicle 1 while travelling along respective associated portions of the section 4.

For civil speeds, the speed limits can be ascertained from the Block ID provided, coupled with an onboard database characterizing the various blocks over which the railway vehicle will travel. Assuming every packet provides a means of uniquely identifying the block, the railway vehicle may estimate how far it has travelled into the block based on an onboard odometer reading at the point at which a new block is identified, via a received packet.

Thanks to the modulated message sent according to the method of the present invention, a more complex speed limit profile can be communicated to the railway vehicle 1, so that it is not limited to the slowest speed limit for all the length of the section 4.

The method of the present invention communicates in a manner per se known by applying time varying voltages to one end of the section 4, which propagates along the rail 2, and it is received at the other end.

Spectral efficiency is the amount of transmitted bits per second divided by the analog bandwidth of the transmitted signal. Spectral efficiency is very important when a communications medium, such as the rail 2, is shared among multiple services, e.g., cab signaling, level crossings, and wayside to wayside signaling. Spectrally efficient systems may support more services or more overall data in the same overall analog bandwidth before co-service interference becomes an issue.

Figure 4:
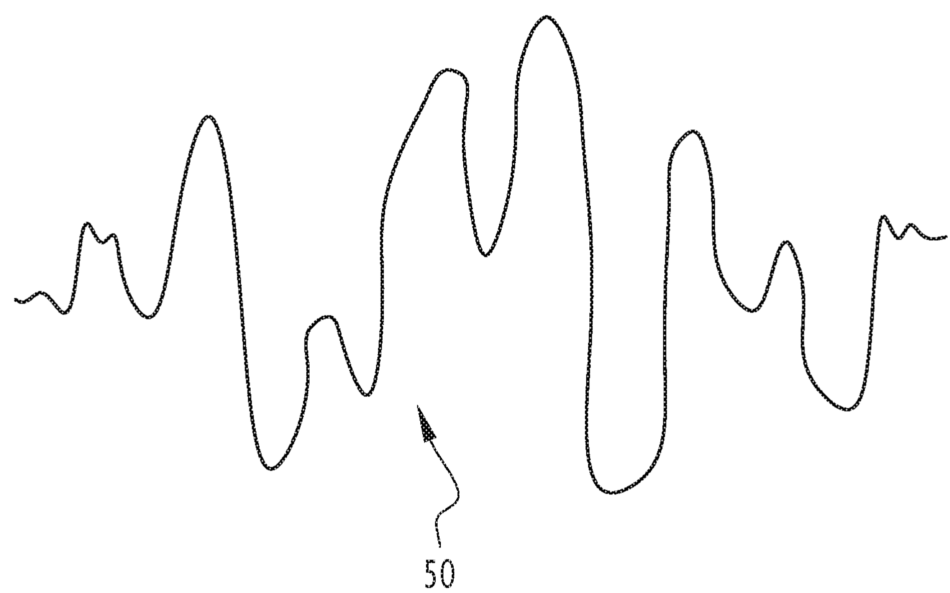
FIG. 4 shows a waveform containing a 44-bit data packet according to the present invention.

FIG. 4 shows a waveform 50 corresponding to a 44-bit data packet (message) of the type above disclosed.

The waveform 50 includes a series of offset root raised cosine (RRC) pulses. The received signal is filtered by a root raised cosine response device, placed in the railway vehicle 1. The final pulse that is decoded is therefore raised cosine. RRC is an example and other spectrally efficient pulse shapes may be used.

Advantageously, the waveform 50 includes twenty-two RRC pulses which are sent by the transmitter of the first wayside device 6*a*, and each pulse is modulated by four levels, to support two bits of data per pulse (4-PAM modulation). Since each received pulse represents two bits, the final data packet of one message contains 44 bits.

In a variant of the invention, M-PAM modulations can be used, M being a power of two.

Also, shorter or longer data packets can be used by varying in a manner per se known the modulation of the waveform 50.

The advantage of RRC transmission is that bandwidth is used much more efficiently, thus allowing more services to share a same overall bandwidth without interfering.

The waveform 50 may be adapted to wayside to railway vehicle communications in different ways.

One possibility is to further perform on the waveform 50 a line coding per se known, to remove DC from the transmitted waveform 50.

Another possibility is to further modulate the waveform 50 with a low frequency carrier, suitable for wayside to railway vehicle communications. For example, the carrier frequency is a frequency applicable to the length of a track circuit associated with the section 4.

A third possibility is to split the 44 data bits of the message into two streams. A first stream of bits is applied to a first intermediate waveform running at one half of a symbol rate of the waveform 50 above disclosed, and then modulated with a sine wave carrier, while a second stream is applied to a second intermediate waveform running at one half of the symbol rate and then modulated with a cosine wave carrier. Advantageously, the two streams of bit contain the same number of bits. This is a form of quadrature amplitude modulation, and is well known in the literature. The first and third possibilities are more spectrally efficient than second possibility.

Reception of data requires turning back the physical waveform 50 into a sequence of bits, and this is done in a manner per se known at the railway vehicle 1.

Figure 5:
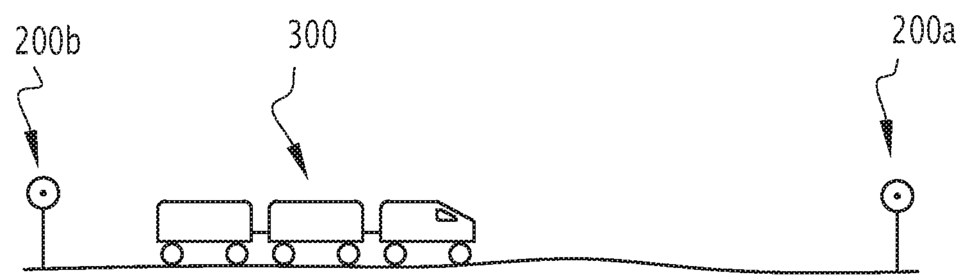
FIG. 5 shows a wayside device according to the present invention.

FIG. 5 shows wayside devices 200*a* and 200*b* (corresponding to the devices 6*a* and 6*b* of FIG. 1) arranged to operate according to the method of the present invention, so as to communicate with a railway vehicle 300.

The advantages of the method of the present invention include more data bits per transmission, increased security, higher spectral efficiency, robustness to changing of the railway track conditions, and support for longer rail sections.

Clearly, the principle of the invention remaining the same, the embodiments and the details of production can be varied considerably from what has been described and illustrated purely by way of non-limiting example, without departing from the scope of protection of the present invention as defined by the attached claims.

The invention claimed is:

1. A wayside to railway vehicle communication method comprising transmitting, by a wayside device to a railway vehicle travelling along a section of a railway track, through an electric waveform put into a rail of the section, at least one message corresponding to a conversion of a data packet into a modulated electric waveform, the data packet including several data bits providing information relative to a plurality of speed limits the railway vehicle has to respect while travelling along respective portions of the section, and wherein the at least one message comprises: Block ID, Block Speed, End Speed, wherein Block ID represents a unique identifier for the section, and Block Speed and End Speed represent the allowable speed at an entry and end points of the section, respectively.

2. The wayside to railway vehicle communication method according to claim 1, wherein the at least one message further comprises Work Zone Present, Work Zone Location, Work Zone Speed, wherein Work Zone Present, Work Zone Location and Work Zone Speed identify if there is a speed restriction area related to railway workers on the section, the relative location of the area within the section, and speed limit within the area respectively.

3. The wayside to railway vehicle communication method according to claim 1, wherein the modulated electric waveform comprises a series of offset root raised cosine (RRC) pulses.

4. The wayside to railway vehicle communication method according to claim 3, wherein the modulated electric waveform comprises twenty-two RRC pulses with each pulse modulated by four levels, to support two data bits per pulse, so that the data packet of the transmitted message contains 44 data bits.

5. The wayside to railway vehicle communication method according to claim 3, wherein the modulated electric waveform comprises twenty-two RRC pulses with each pulse modulated by M levels, M being greater than four.

6. The wayside to railway vehicle communication method according to claim 1, further comprising line coding on the modulated electric waveform to remove DC from the modulated electric waveform.

7. The wayside to railway vehicle communication method according to claim 1, wherein the modulated electric waveform is further modulated with a carrier frequency applicable to a length of a track circuit associated with the section.

8. The wayside to railway vehicle communication method according to claim 1, further including splitting the data bits into a first stream of bits applied to a first intermediate waveform running at one half of the symbol rate of the modulated electric waveform and then modulated with a sine wave carrier, and into a second stream of bits applied to a second intermediate waveform running at one half of the symbol rate and then modulated with a cosine wave carrier.

9. The wayside to railway vehicle communication method according to claim 8, wherein the first and the second stream of bits each contain the same number of bits.

10. A wayside communication device comprising a transmitter transmitting to a railway vehicle travelling along a section of a railway track, through an electric waveform put into a rail of the section, at least one message corresponding to a conversion of a data packet into a modulated electric waveform, the data packet including several data bits providing information relative to a plurality of speed limits the railway vehicle has to respect while travelling along respective portions of the section, and wherein the at least one message comprises: Block ID, Block Speed, End Speed, wherein Block ID represents a unique identifier for the section, and Block Speed and End Speed represent the allowable speed at an entry and end points of the section, respectively.

11. A wayside to railway vehicle communication method comprising transmitting, by a wayside device to a railway vehicle travelling along a section of a railway track, through an electric waveform put into a rail of the section, at least one message corresponding to a conversion of a data packet into a modulated electric waveform, the data packet including several data bits providing information relative to a plurality of speed limits the railway vehicle has to respect while travelling along respective portions of the section, wherein the modulated electric waveform is further modulated with a carrier frequency applicable to a length of a track circuit associated with the section.

12. A wayside communication device comprising a transmitter transmitting to a railway vehicle travelling along a section of a railway track, through an electric waveform put into a rail of the section, at least one message corresponding to a conversion of a data packet into a modulated electric waveform, the data packet including several data bits providing information relative to a plurality of speed limits the railway vehicle has to respect while travelling along respective portions of the section, wherein the modulated electric waveform is further modulated with a carrier frequency applicable to a length of a track circuit associated with the section.

* * * * *